United States Patent [19]

Mueller et al.

[11] Patent Number: 5,318,955
[45] Date of Patent: Jun. 7, 1994

[54] USE OF SELECTED ETHERS OF MONOFUNCTIONAL ALCOHOLS IN DRILLING FLUIDS

[75] Inventors: Heinz Mueller, Monheim; Gerhard Stoll, Korschenbroich; Claus-Peter Herold, Mettmann; Stephan von Tapavicza, Erkrath, all of Fed. Rep. of Germany

[73] Assignee: Henkel Kommanditgesellschaft auf Aktien, Duesseldorf, Fed. Rep. of Germany

[21] Appl. No.: 37,499

[22] Filed: Mar. 24, 1993

Related U.S. Application Data

[63] Continuation of Ser. No. 768,419, Oct. 7, 1991, abandoned.

[30] Foreign Application Priority Data

Apr. 7, 1989 [DE] Fed. Rep. of Germany ....... 3911299

[51] Int. Cl.$^5$ .............................................. C09K 7/06
[52] U.S. Cl. ...................................... 507/139; 507/138
[58] Field of Search ................................... 507/138, 139

[56] References Cited

U.S. PATENT DOCUMENTS

| | | | |
|---|---|---|---|
| 1,989,147 | 4/1935 | Ambrose et al. | 252/8.5 |
| 2,661,334 | 12/1953 | Lummus | 252/8.5 |
| 3,062,740 | 11/1962 | Reddie et al. | 252/8.5 |
| 3,244,638 | 4/1966 | Foley et al. | 252/8.5 |
| 3,761,410 | 9/1973 | Mondshine et al. | 252/8.5 |
| 4,409,108 | 10/1983 | Carney et al. | 507/138 |
| 4,631,136 | 12/1986 | Jones, III | 507/138 |
| 4,839,096 | 6/1989 | Dennis et al. | 507/136 |

OTHER PUBLICATIONS

Peters, R. "Alcohols, Higher Aliphatic" in: *Kirk-Othmer Encyclopedia of Chemical Technology* (1991 ed.), vol. 1, pp. 885–887.
Gray et al, *Composition and Properties of Oil Well Drilling Muds* (Houston, Gulf Publishing Co., 1980) pp. 319–324.

*Primary Examiner*—Gary Geist
*Attorney, Agent, or Firm*—Ernest G. Szoke; Wayne C. Jaeschke; Real J. Grandmaison

[57] ABSTRACT

The invention describes the use of water-insoluble esters with flash points above 80° C., from monohydric alcohols of natural and/or synthetic origin with at least 4 carbon atoms, preferably at least 6 carbon atoms in the alcohol radicals, as the oil phase, or a constituent of the oil phase of invert drilling fluids which exist as W/O-emulsions, have a dispersed aqueous phase and ideally also have further usual additives in the continuous oil phase, which is fluid and pumpable in the temperature range of 0° to 5° C., and which are suitable for the environment-friendly development of, e.g., petroleum and natural gas deposits. Drilling fluids of the above type are also described which are characterized in that they contain as the continuous oil phase, or dissolved in ecologically-acceptable water-insoluble oils, an additive of at least largely water-insoluble ethers from monohydric alcohols, the oil phase in each case being fluid and pumpable in the temperature range of 0° to 5° C. and having flash points above 80° C.

16 Claims, No Drawings

USE OF SELECTED ETHERS OF MONOFUNCTIONAL ALCOHOLS IN DRILLING FLUIDS

This application is a continuation of application Ser. No. 07/768,419 filed on Oct. 7, 1991 now abandoned.

BACKGROUND OF THE INVENTION

1. Field of the Invention

The invention discloses new drilling fluids and invert drilling muds based thereon, which are distinguished by high ecological acceptability and at the same time good storage and application properties. An important area of application for the new drilling fluid systems is in offshore wells for the development of petroleum and/or natural gas deposits, the aim of the invention being particularly to make available industrially usable drilling fluids with high ecological acceptability. The use of the new drilling fluid systems has particular significance in the marine environment, but is not limited thereto. The new mud systems can be put to quite general use even in land-based drilling, for example, in geothermal wells, water bore-holes, in the drilling of geoscientific bores and in drilling for the mining industry. Here too it is essentially true that associated ecotoxic problems are substantially simplified by the ester-based drilling-oil fluids selected according to the invention.

2. Discussion of Related Art

Oil-base drilling fluids are generally used in the form of so-called invert-emulsion muds, which consist of a three-phase system: oil, water and finely particulate solids. These are preparations of the W/O-emulsion type, i.e. the aqueous phase is distributed as a heterogeneous fine dispersion in the continuous oil phase. A number of additives can be used to stabilize the system as a whole and to confer on it the desired application properties, particularly emulsifiers or emulsifier systems, weighting agents, fluid-loss additives, alkali reserves, viscosity regulators and the like. For details, refer, e.g., to the publication by P. A. Boyd et al. "New Base Oil Used in Low-Toxicity Oil Muds" Journal of Petroleum Technology, 1985, 137 to 142, and R. B. Bennett, "New Drilling Fluid Technology—Mineral Oil Mud" Journal of Petroleum Technology, 1984, 975 to 981 and the literature cited therein.

The importance of ester-based oil phases in reducing the problems created by such oil-base muds has been recognized for some time in the relevant field of technology. For example, U.S. Pat. Nos. 4,374,737 and 4,481,121 disclose oil-base drilling fluids in which non-polluting oils are to be used. The following are of equal value as the non-polluting oils—mineral oil fractions which are free from aromatic hydrocarbons, and vegetable oils, such as peanut oil, soybean oil, linseed oil, corn oil, rice oil or even oils of animal origin, such as whale oil. These named ester oils of vegetable and animal origin are all, without exception, triglycerides of natural fatty acids, which are known to be of high environment acceptability, and are clearly superior ecologically to hydrocarbon fractions—even when these do not contain aromatic hydrocarbons.

Interestingly enough, however, not one of the examples in the above U.S. patent specifications describes the use of such natural ester oils in invert-drilling fluids of this type. In every case, mineral oil fractions are used as the continuous oil phase. Oils of vegetable and/or animal origin are not considered for practical reasons. The rheological properties of such oil phases cannot be controlled over the wide temperature range generally required in practice, from 0° to 5° C. on the one hand, up to 250° C. on the other.

THE APPLICANT'S EARLIER PROPOSALS

Ester oils of the type in question do not in fact behave in the same way in practice as the previously used mineral oil fractions based on pure hydrocarbons. Ester oils are subject to partial hydrolysis in practical use, particularly in W/O-invert drilling muds. Free carboxylic acids are formed as a result. The Applicant's earlier Applications P 38 42 659.5 and P 38 42 703.6 (U.S. Ser. Nos. 07/452,457 and 07/452,988 both abandoned) describe the problems caused thereby and give proposals for their solution. Further adaptations of usable ester oils are disclosed in the earlier Patent Applications P 39 07 391.2 and P 39 07 392.0 (application Ser. Nos. 07/752,694, filed Sep. 6, 1991, and 07/752,692, filed Sep. 6, 1991, both abandoned). The subject of these earlier Applications is the use of ester oils based on selected monocarboxylic acids or monocarboxylic acid mixtures and monofunctional, and optionally polyfunctional, alcohols. The earlier Applications show that, with the esters an ester mixtures they disclose, it is not only possible to invest fresh drilling fluid with satisfactory rheological properties, but it is also possible to use selected known alkali reserves in the drilling fluid and in this way to retard undesirable corrosion. As alkali reserves—particularly when ester oils based on carboxylic acids with at least 6 carbon atoms are used—calcium hydroxide, or lime, can be added and/or can be used with zinc oxide or comparable zinc compounds. In this case, however, an additional restriction is advisable. To prevent unwanted thickening of the oil-base invert mud system in practical use, the amount of alkalizing additive, and in particular the amount of lime, must be limited. The maximum amount permitted in the disclosure of the aforementioned earlier Applications is about 2 lb/bbl (pounds/barrel) of oil-base mud.

An important further development of these invert-drilling fluids based on ester oils is the subject of the Applicant's earlier Application P 39 03 785.1 (U.S. Ser. No. 07/478,185 now abandoned).

The teaching of this earlier Application is based on the concept of using a further additive in the invert drilling fluids based on ester oils, which is suited to keeping the desired rheological properties of the drilling fluid within the required range, even when ever larger amounts of free carboxylic acids are formed in use by partial ester hydrolysis. These liberated carboxylic acids should not only be caught in a harmless form, it should moreover be possible to convert these free carboxylic acids, preferably into valuable components with stabilizing or emulsifying properties for the whole system. According to this teaching, basic amine compounds of marked oleophilic nature and at most limited water solubility, which are capable of forming salts with carboxylic acids, can be used as additives in the oil phase. The oleophilic amine compounds can at the same time be used at least in part as alkali reserves in the invert drilling fluid, they can, however, also be used in combination with conventional alkali reserves, particularly together with lime. The use of oleophilic amine compounds which are at least largely free from aromatic constituents is preferred. In particular, optionally olefin-unsaturated aliphatic, cycloaliphatic and/or heterocyclic oleophilic basic amine compounds, can be considered, which contain one or more N-groups capable of forming salts with carboxylic acids. In a preferred embodiment the water-solubility of these amine compounds at room temperature is at most about 5% by weight and is usefully below 1% by weight.

Typical examples of such amine compounds are primary, secondary and/or tertiary amines, which are at least largely water-soluble, and which can also to a limited extent be alkoxylated and/or substituted, particularly with hydroxyl groups. Further examples are the corresponding aminoamides and/or heterocyclic compounds with nitrogen as a ring constituent. For example, basic amine compounds are suitable which have at least one long-chain hydrocarbon radical, preferably of from 8 to 36 carbon atoms, particularly with 10 to 24 carbon atoms, which can also be olefin mono- or poly-unsaturated. The oleophilic basic amine compounds can be added to the drilling fluid in amounts of up to about 10 lb/bbl, preferably in amounts up to about 5 lb/bbl and particularly in the range of about 0.1 to 2 lb/bbl.

It has been found that the use of such oleophilic basic amine compounds can effectively prevent thickening of the mud system, which presumably can be attributed to a disturbance of the W/O invert system and also to the formation of free carboxylic acids by ester hydrolysis.

DESCRIPTION OF THE INVENTION

Other than in the operating examples, or where otherwise indicated, all numbers expressing quantities of ingredients or reaction conditions used herein are to be understood as modified in all instances by the term "about".

THE INVENTION PROBLEM AND ITS TECHNICAL SOLUTION

The problem of the present invention is further to develop systems of the type in question and in particular drilling fluids of high ecological acceptability. In a first embodiment the invention proposes to make available oils and oil mixtures for the production of drilling fluids based on W/O-emulsions, which can be used industrially and are easily accessible and at the same time are distinguished by high ecological acceptability. In a further embodiment the invention intends to make available additives for the aforementioned systems in question here, which confer valuable additive properties on drilling fluids based on W/O-emulsions without having a disadvantageous effect on their ecological acceptability.

The technical solution of the problems of the invention starts from the knowledge that selected ethers suited to this use can result in new and improved drilling fluids of the type described. These ethers are water-insoluble or essentially water-insoluble components, in particular therefore corresponding compounds with a pronounced oleophilic nature, which differ, however, from pure hydrocarbon compounds by the presence of the functional ether group. As a result important technological improvements can be made and at the same time high ecological acceptability is ensured.

The subject of the invention is accordingly, in a first embodiment, the use of water-insoluble ethers, with flash points above 80° C., of monohydric alcohols of natural and/or synthetic origin with at least 4 carbon atoms, preferably at least 6 carbon atoms in the alcohol radicals, as the oil phase, or a constituent of the oil phase, of invert-drilling fluids, which exist as W/O-emulsions and which, in the continuous oil phase, which is fluid and pumpable in the temperature range of 0° to 5° C., have a dispersed aqueous phase and preferably further usual additives and which are suitable for the environmentally acceptable development of, for example, petroleum or natural gas deposits.

In a further embodiment the invention relates to invert drilling fluids, as described above, which are characterized in that they contain, as a continuous oil phase or dissolved in ecologically acceptable oils, an additive which consists at least predominantly of water-insoluble ethers of monohydric alcohols, such that the respective oil phase is fluid and pumpable in the temperature range of 0° to 5° C. and has flash points above 80° C.

THE VARIOUS EMBODIMENTS OF THE INVENTION

In a first embodiment the continuous oil phase of the invert drilling fluids is formed exclusively, or to by far the largest part, by the essentially water-insoluble and preferably markedly oleophilic ethers. Understandably, the rheology of the ethers used here must be suited to the technical requirements of the drilling fluids. Slight rheological adjustments are possible by adding small amounts of the diluents provided in this embodiment. In the case described here, in particular oil phases can be considered, which are formed by more than 70% by weight, preferably by more than 80% by weight, and desirably exclusively, by the ethers themselves. The general subject knowledge is applicable for the rheological requirements of such oils for use in drilling fluids, and this will be discussed again below.

The definition according to the invention of the term "suitable ethers" includes quite common symmetrical ethers, derived from a selected alcohol, mixed ethers from different alcohols and/or ether mixtures of the two ether types mentioned above. From the broad range of suitable individual ethers or mixed ethers and/or ether mixtures, those agents can be considered in particular which are at least in part the corresponding derivatives of monofunctional alcohols with at least 6 to 7 carbon atoms, preferably with at least 8 carbon atoms, the possible upper limit of the carbon number being greatly influenced by the structure of the hydrocarbon radical. The known effect of branched-chain and/or un-saturated structure of a hydrocarbon radical in corresponding alcohols also influences the rheology of the ethers formed therefrom.

The rheology of branched-chain and/or unsaturated ethers of the type in question here is known to meet the requirements of flowability and pumpability, even at lower temperatures, more easily than the straight-chain saturated hydrocarbon structure. Saturated straight-chain fatty-alcohol-ethers with from 16-18 carbon atoms are known to have high setting ranges. Branched ethers of the same carbon-number range can—depending on the extent and degree of branching—constitute completely acceptable fluid and pumpable oil phases in the sense of the invention. In the field of saturated ethers from monofunctional alcohols, the range with low numbers of carbon atoms is particularly suitable, particularly therefore the range of about 8-14 carbon atoms, here too the ethers from branched-chain alcohols can have rheological advantages.

The oil-mixture components optionally used in small amounts in this embodiment can be pure hydrocarbon compounds especially those free from aromatic hydrocarbons, in particular selected ester oils of the type described in the Applicant's earlier Applications mentioned above.

The rheological properties of the ether components used according to the invention become less and less important, the greater the proportion of these mixtures constituents in the admixture with one or more oil components. A second embodiment of the invention relates accordingly to the use of oil phases in systems of the type in question which still have considerable or even predominant amounts of non-water-miscible oils, which are used in admixture with the ethers provided according to the invention. The ether content selected according to the invention in this embodiment is as a rule more than 10% by weight and up to about 70% by weight—each referred to the fluid oil phase—an ether fractions in amounts of at least about 35% by weight and preferably at least about 50% by weight of the oil phase may be preferred.

As the mixture components for this second embodiment of the invention, there can be considered both pure hydrocarbon oils, particularly those free from aromatic hydrocarbons, and especially ester oils of the type described in earlier Applications by the Applicant. Such admixtures also fall within the framework of the invention, with both admixtures of ester oils with pure hydrocarbon compounds and mixtures of various ester oil types possible for use as mixture components for general use with the oleophilic ethers. In preferred embodiments of the invention, the pure hydrocarbon oils with no functional groups at all are used in the oil phase in amounts of at most 50% by weight, preferably of at most about 35% by weight and particularly in amounts of at most about 25% by weight—each referred to the oil phase. In the most important embodiments of the variants described here, mixtures of the ethers and ester oils defined according to the invention are used as the oil phase without the addition of pure hydrocarbon compounds.

The invention finally relates in a third variant to the use of practically water-insoluble ethers as additives in the oil phase of the aforementioned drilling fluids based on W/O-emulsions. The amount of ethers used according to the invention is usually in the range of about 0.1 to a maximum of 10% by weight, preferably in the range of about 1 to 5% by weight of the oil phase. The range of suitable water-insoluble ethers can understandably be enlarged substantially in this embodiment. The rheology of the system as a whole is no longer determined here by the rheological values of the ether. It is in this embodiment that the use of the ethers defined according to the invention as additives achieves important improvements in the behaviour of drilling fluids of the aforementioned type.

This is true in particular for invert systems in which the main component of the continuous oil phase is formed exclusively or primarily by ester oils of the type described in the above earlier Applications of the Applicant. In the embodiment in question here, the oil phase is constituted accordingly by at least 25% by weight, preferably by at least 50% by weight and particularly by at least about 75 to 80% by weight of the oil phase by an ester oil as the main component. Pure hydrocarbon oils of the prior art can be used for the rest of the oil phase, it is however advantageous to dispense with them altogether.

By adding to the invert systems the water-insoluble ethers defined according to the invention, important improvements can be achieved for the practical use of the drilling fluids. The following 4 aspects are particularly affected: reduction of the fluid-loss values, the facilitation and improvement of the emulsification of the dispersed aqueous phase, in some cases clearly improved lubrification by the drilling fluid and in some cases a distinct improvement in the rheological properties of invert drilling fluids based on ester oils.

THE ETHERS USED ACCORDING TO THE INVENTION

The use of the ethers as the oil phase, but also their combination as a lesser or greater part in the oil phase, requires these ethers to have adequate water-insolubility. The water-insolubility of suitable ethers at room temperature preferably lies below 5% by weight, particularly under 1% by weight and preferably not more than about 0.1% by weight.

The following general rules apply for the chemical nature of the ethers:

The special structure of the ethers used in the method according to the invention is primarily determined by the embodiment selected in each case, in which the composition of the ether-containing oil phase is selected, see here the previous sub-section.

If the ethers from the oil phase exclusively or if the ethers are present at least as the major mixture component in the application mixture forming the continuous oil phase, the selection of suitable ethers or ether mixtures is initially determined by the corresponding basic rheological data. In this case, in detail, the ether or the ether mixtures used in the temperature range of 0° to 5° C. should have a Brookfield (RVT) viscosity not above 50 mPa.s, preferably not above 40 mPa.s and particularly at most of about 30 mPa.s. The solidification values (pour and setting point) of the ether or ethers should at the same time lie below 0° C. Preferably, ethers or ether mixtures are used with solidification values below −5° C. and particularly below −10° C.

Finally, the flash points of the ether or ethers used are important for practical use, these are advantageously not below 90° C. and preferably above 100° C. Much higher flash points, for example, those above 130° C. and in particular above 150° C., can be particularly useful.

As already discussed in the preceding sub-section, the overall nature of the rheological properties and the flash point is greatly determined by the individual molecular structure of the ether-forming alcohols. These structural features are discussed below:

An important element of the invention is the use of comparatively non-toxic components, as a result the use, for example, of aromatic ethers in particular of the phenol ether type is therefore practically excluded. Aliphatic, optionally olefin mono- and/or polyunsaturated alcohols with a straight-chain and/or branched hydrocarbon structure and also optionally cycloaliphatic alcohols are the most important ether-forming components in the sense of the method according to the invention. The lower limit for the number of carbon atoms in such alcohols is 4 carbon atoms, preferably 6 carbon atoms and particularly 8 carbon atoms. The upper limit for the number of carbon atoms in the ether-forming alcohols can also be chosen quite high depending on the rheology requirements and lies, for example, at about 36 carbon atoms, preferably at about 32 carbon atoms. In particular, monofunctional alcohols can be considered with about 6–24 carbon atoms, preferably from 6–18 carbon atoms. Ethers of $C_{8-16}$-alcohols and in particular $C_{8-14}$-alcohols, are suitable components in the sense of the teaching of the invention.

The ether-forming alcohols can be completely or at least partly of straight-chain and/or branched-chain type, even and/or odd-numbered, saturated and/or unsaturated. The ether-forming alcohols here can again be completely or partly of natural and/or synthetic origin.

Within the limit conditions indicated, certain selected ethers or ethers from certain selected alcohols, mixed ethers from certain selected alcohols and/or ether mixtures are suitable. Since the ether function is inert, at least to a great extent, both to the constituents introduced with the drilling fluid and to the chemical actions taking place when the drilling fluid is used—this is also true in particular for the alkalized invert W/O-based emulsions—there is almost no restriction of choice, and therefore the rheological data required in the drilling fluid can be set at an optimum level and achieved. Secondary reactions when in use, such as are typical for the ester oils in alkalized W/O-invert emulsions, need not be seriously considered for ethers used as the oil phase or as mixture components of the oil phase.

THE MIXTURE COMPONENTS IN THE OIL PHASE

Suitable oil components for the admixture according to the invention are the mineral oils currently used in drilling fluids, and preferably aliphatic and/or cycloaliphatic hydrocarbon fractions essentially free from aromatic hydrocarbons, with the required rheological properties. Refer here to the prior-art publications cited above and the available commercial products.

Particularly important mixture components, however, are ester oils which are ecologically acceptable as used in the invention, as described in particular in the aforementioned earlier Applications P 38 42 659.5, P 38 42 703.6, P 39 07 391.2 and P 39 07 392.0 (U.S. Ser. Nos. 07/452,457, 07/452,988 both abandoned). To complete the invention disclosure, the essential characteristics of these esters, or ester mixtures, are now briefly summarized.

In a first embodiment, as the oil phase, esters are used of monofunctional alcohols with from 2 to 12, particularly with from 6 to 12, carbon atoms and aliphatic-saturated monocarboxylic acids with from 12 to 16 carbon atoms, which [esters] are fluid and pumpable in a temperature range of 0° to 5° C., or an admixture thereof with at most about the same amounts of other monocarboxylic acids. Ester oils are preferred which are based, to at least about 60% by weight—referred to the respective carboxylic acid mixture—, on esters of aliphatic $C_{12-14}$-monocarboxylic acids, the remaining percentage preferably being based on smaller amounts of shorter-chain aliphatic and/or longer-chain, in particular olefin mono- or poly-unsaturated, monocarboxylic acids. Esters are preferably used which in the temperature range of 0° to 5° C. have a Brookfield (RVT) viscosity of not more than 50 mPa.s, preferably not above 40 mPa.s and particularly of a maximum of about 30 mPa.s. The esters used in the drilling mud have solidification values (pour and setting point) below −10° C., preferably below −15° C. and at the same time have flash points above 100° C., preferably above 150° C. The carboxylic acids present in the ester or ester mixtures are straight-chain and/or branched, and are of vegetable and/or synthetic origin. They can be derived from the corresponding triglycerides, such as coconut oil, palm kernel oil and/or babassu oil. The alcohol radicals of the esters used are derived in particular rom straight-chain and/or branched saturated alcohols, preferably with from 6 to 10 carbon atoms. These alcohol components can also be of vegetable and/or animal origin and can thus be obtained by the reductive hydrogenation of the corresponding carboxylic acid esters.

A further class of particularly suitable ester oils is derived from olefin mono- and/or poly-unsaturated monocarboxylic acids with 16 to 24 carbon atoms or their admixtures with smaller amounts of other, particularly saturated, monocarboxylic acids and monofunctional alcohols with preferably from 6 to 12 carbon atoms. These ester oils are also fluid and pumpable in the temperature range of 0° to 5° C. In particular those esters are suitable which are derived, by more than 70% by weight, preferably by more than 80% by weight and in particular by more than 90% by weight, from olefin-unsaturated carboxylic acids with from 16 to 24 carbon atoms.

Here too, the solidification values (pour and setting point) lie below −10° C., preferably below −15° C., while the flash points lie above 100° C. and preferably above 160° C. In the temperature range of 0° to 5° C., the esters used in the drilling mud have a Brookfield (RVT) viscosity of not more than 55 mPa.s, preferably not more than 45 mPa.s.

Two subclasses can be defined for the ester oils of the type in question. In the first, the unsaturated $C_{16-24}$-monocarboxylic acid radicals present in the ester are derived by not more than 35% by weight from olefin di- and poly-unsaturated acids, with preferably at least about 60% by weight of the acid radicals being olefin mono-unsaturated. In the second embodiment, the $C_{16-24}$-monocarboxylic acids present in the ester mixture are derived, by more than 45% by weight, preferably by more than 55% by weight, from olefin di- and/or poly-unsaturated acids. It is desirable for the saturated carboxylic acids with from 16 to 18 carbon atoms, which are present in the ester mixture, to amount to not more than about 20% by weight and in particular not more than about 10% by weight. Preferably, saturated carboxylic acid esters, however, have lower numbers of carbon atoms in the acid radicals. The carboxylic acid radicals present can be of vegetable and/or animal origin. Examples of vegetable raw materials are, for example, palm oil, peanut oil, castor oil and in particular colza oil. The carboxylic acids of animal origin are in particular the corresponding mixtures of fish oils, such as herring oil.

A further interesting class of ester oils which can be used as mixture components for the use according to the invention, are esters which are fluid at room temperature and have flash points above 80° C., from $C_{1-5}$-monocarboxylic acids and mono- and/or polyfunctional alcohols, which are preferably also fluid and pumpable in the temperature range of 0° to 5° C. Particularly suitable are the corresponding esters of these lower carboxylic acids with monofunctional alcohols with at least 8 carbon atoms and/or esters of these acids with di- to tetra-hydric alcohols with preferably 2 to 6 carbon atoms. Acetic acid in particular is suitable for practical reasons as the ester-forming acid-component of this class. The specifications for the rheology and volatility and the solidification values of the preferred esters in this sub-class correspond to the values given above.

Suitable mixture components from this sub-class are, in particular, esters from monofunctional alcohols of natural and/or synthetic origin, the chain length of which in the presence of predominantly aliphatic-unsaturated alcohols can be in the range of 8 to 15 carbon atoms, but in the case of olefin mono- and poly-unsaturated alcohols, can also consist of higher numbers of carbon atoms, for example, up to about 24 carbon atoms. Details can be found in the Applicant's earlier Patent Application P 39 07 391.2 (application Ser. No. 07/752,694, filed Sep. 6, 1991, now abandoned).

Suitable mixture components are finally, however, the esters, as described in the Applicant's co-pending Application P 39 07 392.0 (application Ser. No. 07/752,692, filed Sep. 6, 1991, now abandoned), from monocarboxylic acids of synthetic and/or natural origin with from 6 to 11 carbon atoms, and mono- and/or polyfunctional alcohols, which are preferably also fluid and pumpable in the temperature range of 0° to 5° C. To complete the invention disclosure, reference is made here to this extent to the above co-pending application, the contents of which are hereby also made subject of the present disclosure.

Suitable mixture components also for the teaching of the present invention are finally at least largely water-insoluble alcohols of a marked oleophilic nature, as described as the oil phase or at least as a constituent of the continuous oil phase of such W/O-invert emulsions in the co-pending Application of the Applicant (application Ser. No. 07/768,937, filed Oct. 7, 1991, now abandoned). For the purposes of the invention disclosure reference is expressly made to the details in this co-pending patent application.

Multi-substance mixtures fall within the scope of the invention, which together with the ethers defined according to the invention, can contain one or more of the mixture components listed here individually.

Essentially any mixtures can be used provided that they fulfil the basic rheological requirements for invert drilling fluids of the type referred to here. Examples of such multi-component mixtures are materials based on various types of ester oils or also substance mixtures additionally containing mineral oil.

FURTHER MIXTURE COMPONENTS OF THE INVERT DRILLING FLUID

These may be any of the usual mixture components for conditioning and for the practical use of invert drilling muds, such as are currently used when mineral oils provide the continuous oil phase. In addition to the dispersed aqueous phase, in particular emulsifiers, weighting agents, fluid-loss additives, viscosifiers and alkali reserves can be considered.

In an important embodiment of the invention, oleophilic basic amine compounds are used as additives together with the ester oils, these amine compounds are described in detail in the aforementioned earlier Application P 39 03 785.1 (U.S. Ser. No. 07/478,185 now abandoned) of the Applicant. For details reference should be made to the disclosure of this earlier Application, as described above.

If ester oils are used as mixture components in the scope of the invention—in particular ester oils based on carboxylic acids with at least 6 carbon atoms—, it can be advantageous not to employ significant amounts of strongly hydrophilic inorganic or organic bases in the oil-base fluid. Lime can be used effectively as an alkali reserve, in which case it is advantageous to limit the maximum amount of lime to be used to about 2 lb/bbl, and it may be preferred to work with a drilling-mud lime content slightly below this figure, e.g. from about 1 to 1.8 lb/bbl (lime/drilling fluid). Other known alkali reserves can be used in addition to, or in place of, the lime. The less basic metal oxides, such as zinc oxide, should particularly be mentioned. Even when these "acid traps" are used, care should still be taken to ensure that the amounts used are not too large, so as to prevent undesired premature ageing of the drilling fluid, which is associated with an increase in viscosity and therefore a deterioration in the rheological properties. The special features discussed here of the use according to the invention prevent, or at least restrict, the formation of undesirable amounts of highly active O/W-emulsifiers so that good rheological properties are maintained in practice for a sufficient period of time even when there is thermal ageing.

The following also applies:

Invert-drilling muds of the type being considered usually contain, together with the continuous oil phase, a finely dispersed aqueous phase in amounts from about 5 to 45% by weight and preferably from about 5 to 25% by weight. A dispersed aqueous phase from about 10 to 25% by weight can be regarded as particularly useful.

The following rheological data apply for the rheology of the preferred invert drilling muds according to the invention: plastic viscosity (PV) from about 10 to 60 mPa.s, preferably from about 15 to 40 mPa.s; yield point (YP) in the range from about 5 to 40 lb/100 ft$^2$, preferably from about 10 to 25 lb/100 ft$^2$—each measured at 50° C. Further details on the measurement of these parameters, the measuring methods used and the rest of the conventional composition of the invert drilling fluids described here, are given in the prior art as cited above and, for example, described in full in the "Manual of Drilling Fluids Technology" of NL-Baroid Co., London, GB, particularly in the chapters "Mud Testing—Tools and Techniques" and "Oil Mud Technology", which is freely accessible to interested experts. In summary, to complete the invention disclosure the following can be said:

The emulsifiers that can be used in practice are systems suitable for the formation of the required W/O-emulsions. In particular, selected oleophilic fatty acids salts, e.g. those based on amidoamine compounds, can be considered. Examples of these are described in the already cited U.S. Pat. No. 4,374,737 and the literature cited therein. A particularly suitable type of emulsifier is the product sold by NL-Baroid Co. under the brand name "EZ-mul".

Such emulsifiers are sold commercially as highly concentrated active-substance preparations and can, for example, be used in amounts from about 2.5 to 5% by weight, particularly in amounts from about 3 to 4% by weight—based on the ester oil phase.

Hydrophobized lignite in particular is used in practice as the fluid-loss additive and thus in particular to form a dense coating of a largely liquid-impermeable film on the bore-hole walls. Suitable amounts are, for example, from about 15 to 20 lb/bbl or from about 5 to 7% by weight, based on the oil phase.

The viscosifier usually employed in drilling fluids of the type in question is a cation-modified finely particulate bentenoite, which can be used particularly in amounts from about 8 to 10 lb/bbl or from about 2 to 4% by weight, based on the oil phase. Barite is the weighting material generally used in relevant applications to establish the necessary pressure compensation, the amounts added being varied according to the drilling conditions anticipated in each case. By adding barite, it is, for example, possible to raise the specific gravity of the drilling fluid to 2.5 and preferably to a value in the range from about 1.3 to 1.6.

The dispersed aqueous phase in these invert drilling fluids is loaded with soluble salts—calcium chloride and/or potassium chloride are mainly used. Saturation, at room temperature, of the aqueous phase with the soluble salt is preferred.

The aforementioned emulsifiers, or emulsifier systems, optionally also serve to improve the oil wettability of the inorganic weighting materials. In addition to the aminoamides already mentioned, further examples are alkylbenzene sulfonates and imidazoline compounds. Additional information regarding the relevant Prior Art can be found in the following published Patent Specifications: GB 2 158 437, EP 229 912 and DE 32 47 123.

EXAMPLES

EXAMPLE 1

An invert-drilling fluid is prepared according to the following formulation with an O/W-ratio of 90/10:

| | |
|---|---|
| 239 ml | dialkylether n-C 8 |
| 6 g | gel former (commercial product "Omnigel") |
| 9 g | WO-emulsifier ("EZ-mul NT" of NL Baroid Co.) |
| 20 g | organophilic lignite ("Duratone" of NL Baroid Co.) |
| 28 g | water |
| 12 g | CaCl$_2$ × 2 H$_2$O |
| 4 g | lime |
| 255 g | barite |

First of all, the plastic viscosity (PV), the yield point (YP) and the gel strength of the invert drilling fluid are measured after 10 seconds and after 10 minutes by a viscosity measurement at 50° C. on the unaged material.

The invert drilling fluid is then aged for 16 hours at 125° C. in the autoclave in the so-called "roller-oven", to test the effect of temperature on the stability of the emulsion. The viscosity values are then measured again at 50° C.

The following are the values determined for the unaged and aged material:

| | unaged material | aged material |
|---|---|---|
| plastic viscosity (PV) | 19 | 21 |
| yield point (YP) | 11 | 8 |
| gel strengths (lb/100 ft$^2$) | | |
| 10 sec. | 4 | 4 |
| 10 min. | 5 | 5 |

HTHP fluid-loss value after ageing 4 ml

EXAMPLE 2

An invert-drilling fluid is prepared with an O/W-ratio of 80/20 according to the following formulation:

| | |
|---|---|
| 210 ml | dialkylether as in Example 1 |
| 6 g | gel former (commercial product "Omnigel") |
| 13 g | organophilic lignite ("Duratone" of NL Baroid Co.) |
| 48.2 g | water |
| 20 g | CaCl$_2$ × 2 H$_2$O |
| 8 g | W/O-emulsifier ("EZ-mul NT" of NL Baroid Co.) |
| 2 g | lime |
| 220 g | barite |

The following are the values determined for the unaged and aged material:

| | unaged material | aged material |
|---|---|---|
| plastic viscosity (PV) | 26 | 25 |
| yield point (YP) | 16 | 9 |
| gel strengths (lb/100 ft$^2$) | | |
| 10 sec. | 7 | 4 |
| 10 min. | 9 | 6 |

HTHP fluid-loss value of aged drilling fluid 1 ml

EXAMPLES 3 TO 5

In the following examples, invert drilling fluids are prepared each with a O//W-ratio of 90/10 according to the following formulation:

| | |
|---|---|
| 230 ml | ether (see the identification below in Examples 3 to 5) |
| 26 ml | water |
| 6 g | gel former (commercial product "Geltone") |
| 12 g | organophilic lignite ("Duratone" of NL Baroid Co.) |
| 2 g | lime |
| 6 g | W/O-emulsifier ("EZ-mul NT" of NL Baroid Co.) |
| 346 g | barite |
| 9.2 g | CaCl$_2$ × 2 H$_2$O |

The following ethers are used in each case as the oil phase:

Example: C$_8$—O—C$_8$
Example 4: C$_{10}$—O—C$_{10}$
Example 3: di-isotridecylether The viscosity values measured for the unaged and aged drilling fluid are summarized below. The ageing is measured once after 16 hours at 125° C. and in a further test after 72 hours at 125° C.

EXAMPLE 3

| | unaged material | aged material 16 hrs/125° C. | aged material 72 hrs/125° C. |
|---|---|---|---|
| plastic viscosity (PV) | 21 | 24 | 29 |
| yield point (YP) | 10 | 7 | 6 |
| gel strengths (lb/100 ft$^2$) | | | |
| 10 sec. | 4 | 3 | 4 |
| 10 min. | 6 | 5 | 6 |

EXAMPLE 4

The test batches of this example are in addition modified in the following way: for the ageing over a period of 72 hours, a drilling fluid of the given formulation is used to which had also been added 2 g of a markedly oleophilic amine (Applicant's commercial product "Araphen G2D"). The following values were measured:

| | unaged material | aged material 16 hrs/125° C. | aged material 72 hrs/125° C. |
|---|---|---|---|
| plastic viscosity (PV) | 34 | 39 | 36 |
| yield point (YP) | 9 | 22 | 16 |
| gel strengths (lb/100 ft$^2$) | | | |
| 10 sec. | 6 | 10 | 7 |

-continued

| | unaged material | aged material 16 hrs/125° C. | aged material 72 hrs/125° C. |
|---|---|---|---|
| 10 min. | 8 | 17 | 8 |

EXAMPLE 5

| | unaged material | aged material 16 hrs/125° C. | aged material 72 hrs/125° C. |
|---|---|---|---|
| plastic viscosity (PV) | 63 | 64 | 63 |
| yield point (YP) | 18 | 17 | 16 |
| gel strengths (lb/100 ft²) | | | |
| 10 sec. | 8 | 6 | 6 |
| 10 min. | 11 | 9 | 9 |

We claim:

1. The process of improving the rheology, lubrication and fluid-loss properties of an invert emulsion drilling mud composition having a continuous oil phase consisting essentially of a water-insoluble oil which is fluid and pumpable at a temperature of about 0° to 5° C. and is selected from (a) an ester of a $C_1$-$C_5$ monocarboxylic acid and a mono- or polyfunctional alcohol, (b) an ester of a $C_6$-$C_{11}$ monocarboxylic acid and a mono- or polyfunctional alcohol, (c) a monocarboxylic acid ester of a $C_6$-$C_{12}$ monofunctional alkanol wherein the monocarboxylic acid contains from 12 to 16 carbon atoms and is aliphatically saturated, and (d) a monocarboxylic acid ester of a $C_6$-$C_{12}$ monofunctional alcohol wherein the monocarboxylic acid contains from 16 to 24 carbon atoms and is olefinically mono- or polyunsaturated, consisting of adding to said drilling mud composition from about 0.1 to about 10% by weight of a substantially water-insoluble ether prepared from a monofunctional alcohol having from 6 to 24 carbon atoms, said ether having a Brookfield (RVT) viscosity of less than about 50 mPas at a temperature of about 0° C. to about 5° C., a pour and setting point of below about 0° C. and a flash point above about 90° C.

2. An invert emulsion drilling mud composition suitable for environmentally-compatible development of petroleum and natural gas deposits, consisting essentially of
(a) a continuous oil phase consisting essentially of a substantially water-insoluble ether prepared from a monofunctional alcohol having from 6 to 24 carbon atoms, said ether having a Brookfield (RVT) viscosity of less than about 50 mPas at a temperature of about 0° C. to about 5° C., a pour and setting point of below about 0° C. and a flash point above about 90° C., said oil phase being fluid and pumpable at a temperature of about 0° to about 5° C. and having a flash point above 80° C.,
(b) an aqueous phase dispersed in said oil phase,
(c) a water-in-oil emulsifier,
(d) a weighting agent,
(e) a viscosifier,
(f) a fluid loss additive, and
(g) an alkali reserve.

3. An invert emulsion drilling mud composition as in claim 2 wherein said aqueous phase is present in an amount of from about 5 to about 45 percent by weight, based on the weight of said oil phase.

4. The process of developing sources of water, oil and gas by drilling, comprising drilling said sources in the presence of the invert emulsion drilling mud composition of claim 3 as the drilling mud.

5. An invert emulsion drilling mud composition as in claim 2 having a plastic viscosity of from about 10 to about 60 mPas, and a yield point of from about 5 to about 40 lbs./100 ft², each measured at about 50° C.

6. The process of developing sources of water, oil and gas by drilling, comprising drilling said sources in the presence of the invert emulsion drilling mud composition of claim 5 as the drilling mud.

7. An invert emulsion drilling mud composition as in claim 2 wherein said ether is present in an amount of at least about 50 percent by weight, based on the weight of said oil phase.

8. The process of developing sources of water, oil and gas by drilling, comprising drilling said sources in the presence of the invert emulsion drilling mud composition of claim 7 as the drilling mud.

9. An invert emulsion drilling mud composition as in claim 2 wherein said monofunctional alcohol comprises an aliphatic unsaturated alcohol having from 8 to 16 carbon atoms.

10. An invert emulsion drilling and composition as in claim 2 wherein said oil phase contains a water-insoluble oil which is fluid and pumpable at a temperature of about 0° to about 520 C. and has a flash point above 100° C. and is selected from (a) an ester of a $C_1$-$C_5$ monocarboxylic acid and a mono- or polyfunctional alcohol, (b) an ester of a $C_6$-$C_{11}$ monocarboxylic acid and a mono- or polyfunctional alcohol, (c) a monocarboxylic acid ester of a $C_6$-$C_{12}$ monofunctional alkanol wherein the monocarboxylic acid contains from 12 to 16 carbon atoms and is aliphatically saturated, and (d) a monocarboxylic acid ester of a $C_6$-$C_{12}$ monofunctional alcohol wherein the monocarboxylic acid contains from 16 to 24 carbon atoms and is olefinically mono- or polyunsaturated.

11. The process of developing sources of water, oil and gas by drilling, comprising drilling said sources in the presence of the invert emulsion drilling mud composition of claim 10 as the drilling mud.

12. An invert emulsion drilling mud composition as in claim 10 wherein the alkali reserve comprises an oleophilic basic amine.

13. The process of developing sources of water, oil and gas by drilling, comprising drilling said sources in the presence of the invert emulsion drilling mud composition of claim 12 as the drilling mud.

14. An invert emulsion drilling mud composition as in claim 10 wherein the alkali reserve comprises lime present in an amount of less than about 2 lbs./bbl of said drilling mud composition.

15. The process of developing sources of water, oil and gas by drilling, comprising drilling said sources in the presence of the invert emulsion drilling mud composition of claim 14 as the drilling mud.

16. The process of developing sources in water, oil and gas by drilling, comprising drilling said sources in the presence of the invert emulsion drilling mud composition of claim 2 as the drilling mud.

* * * * *

UNITED STATES PATENT AND TRADEMARK OFFICE
CERTIFICATE OF CORRECTION

PATENT NO. : 5,318,955
DATED : June 7, 1994
INVENTOR(S) : Mueller et. al.

It is certified that error appears in the above-indentified patent and that said Letters Patent is hereby corrected as shown below:

In claim 10, column 14, line 27, "and", should read:
-- mud --.

In claim 10, column 14, line 30, "520", should read:
-- 5° --.

Signed and Sealed this

Fourth Day of April, 1995

Attest:

BRUCE LEHMAN

*Attesting Officer*    *Commissioner of Patents and Trademarks*

UNITED STATES PATENT AND TRADEMARK OFFICE
CERTIFICATE OF CORRECTION

PATENT NO. : 5,318,955
DATED : June 7, 1994
INVENTOR(S) : Mueller et. al.

It is certified that error appears in the above-indentified patent and that said Letters Patent is hereby corrected as shown below:

In claim 10, column 14, line 27, "and", should read:
-- mud --.

In claim 10, column 14, line 30, "520", should read:
-- 5° --.

Signed and Sealed this

Twenty-third Day of May, 1995

Attest:

BRUCE LEHMAN

Attesting Officer    Commissioner of Patents and Trademarks